(12) United States Patent
Carver (10) Patent No.: US 12,152,364 B2
(45) Date of Patent: Nov. 26, 2024

(54) JOINT

(71) Applicant: WRR Pedley & Co. Ltd., West Midlands (GB)

(72) Inventor: Charles Carver, Wolverhampton (GB)

(73) Assignee: WRR Pedley & Co. Ltd., West Midlands (GB)

( * ) Notice: Subject to any disclaimer, the term of this patent is extended or adjusted under 35 U.S.C. 154(b) by 0 days.

(21) Appl. No.: 18/002,641

(22) PCT Filed: Jul. 6, 2021

(86) PCT No.: PCT/GB2021/051708
§ 371 (c)(1),
(2) Date: Dec. 20, 2022

(87) PCT Pub. No.: WO2022/008892
PCT Pub. Date: Jan. 13, 2022

(65) Prior Publication Data
US 2023/0243117 A1  Aug. 3, 2023

(30) Foreign Application Priority Data

Jul. 10, 2020 (GB) ..................... 2010624

(51) Int. Cl.
*E02D 5/52* (2006.01)
*F16B 7/04* (2006.01)

(52) U.S. Cl.
CPC ............ *E02D 5/526* (2013.01); *F16B 7/0413* (2013.01); *E02D 2600/20* (2013.01)

(58) Field of Classification Search
CPC ....... E02D 5/526; E02D 2600/20; E02D 5/30; E02D 5/523; F16B 7/0413
See application file for complete search history.

(56) References Cited

U.S. PATENT DOCUMENTS

| 3,884,589 A | 5/1975 | Liedholm |
| 4,009,550 A * | 3/1977 | Young .................... E02D 5/523 405/251 |

(Continued)

FOREIGN PATENT DOCUMENTS

| CN | 106436691 A | 2/2017 |
| DK | 99976 C | 10/1964 |

(Continued)

OTHER PUBLICATIONS

International Search Report and Written Opinion received for PCT Patent Application No. PCT/GB2021/051708, mailed on Nov. 10, 2021, 12 pages.

(Continued)

*Primary Examiner* — Benjamin F Fiorello
(74) *Attorney, Agent, or Firm* — ADLER POLLOCK & SHEEHAN P.C.

(57) ABSTRACT

Disclosed is a joint for connecting first and second elongate members together end to end, the joint comprising: a first connecting structure and a second connecting structure at an opposed end of the second elongate member; one of the first and second connecting structures comprising at least one male connector unit having a longitudinally projecting male part which is tapered in the longitudinal direction; the other of the first and second connecting structures having at least one female connector unit defining a correspondingly tapered recess into which the male part is received; the other of the first and second connecting structures defining lateral locking pin holes aligned either side of the recess and the male part having a corresponding lateral locking pin hole; and a locking pin insertable through the corresponding locking pin holes.

19 Claims, 6 Drawing Sheets

(56) References Cited

U.S. PATENT DOCUMENTS

| | | | | |
|---|---|---|---|---|
| 4,362,416 A * | 12/1982 | Kaimo | ................... | E02D 5/523 |
| | | | | 403/374.2 |
| 4,362,417 A * | 12/1982 | Vesa | ...................... | E02D 5/523 |
| | | | | 403/374.2 |
| 4,865,504 A * | 9/1989 | Kaimo | ................... | E04B 1/215 |
| | | | | 411/522 |
| 5,032,041 A * | 7/1991 | Sinnes | ................... | E02D 5/523 |
| | | | | 403/379.4 |
| 9,038,274 B2 * | 5/2015 | Koivunen | ................. | E02D 5/30 |
| | | | | 29/897.3 |
| 2021/0388570 A1* | 12/2021 | Tupala | ................... | E02D 5/526 |

FOREIGN PATENT DOCUMENTS

| | | |
|---|---|---|
| EP | 2204498 A1 | 7/2010 |
| RU | 2039887 C1 | 7/1995 |
| WO | 2020/094923 A1 | 5/2020 |

OTHER PUBLICATIONS

Search Report received for GB Patent Application No. 2010624.1, mailed on Dec. 8, 2020, 1 page.

\* cited by examiner

JOINT

TECHNICAL FIELD OF THE INVENTION

The present invention relates to a joint for connecting two elongate members together. The present invention relates in particular, but not exclusively, to a joint for connecting together two concrete pile sections.

BACKGROUND TO THE INVENTION

It is known to use elongate, reinforced concreate piles which are at least partially embedded in the ground to support a load, such as a building. It is known to use precast concrete piles which are cast off-site and transported by road to the site where they are driven into the ground. Where there is a need for a pile which is longer than can be cast and transported in this way or which would be too long to be erected for driving into the ground due to limitations in headroom, it is known to mechanically join or splice two pile sections together end to end in a butt joint. In a known arrangement, corresponding connecting structures are attached to the opposed ends of the pile sections that are to be joined together. Typically, these are made of metal, especially steel which may be stainless steel, and are cast in the pile sections. One of the connecting structures has a cylindrical spigot which projects longitudinally from the end of the pile section and the other connecting structure has a socket which defines a corresponding cylindrical recess in which the spigot is received with a close fit. A locking pin hole extends laterally through the spigot and corresponding locking pin holes are defined in the socket either side of the recess. A locking pin is inserted through a transverse hole in the end of the pile section into and through the transverse holes in the spigot and the socket to lock them together. In one known arrangement, the butt joint comprises a four-point joint with each connecting structure having a pair of spigots and a pair of sockets, the spigots of one of the connecting structures being received in the recesses in the sockets of the other of the connecting structures and locking pins used to secure each spigot in its socket.

Inserting the locking pin in the known arrangement can be difficult if the transverse holes are not correctly aligned. Often the locking pin has to be driven in with force and this may result in the pin being bent. Furthermore, accurate machining and positioning of the spigots and sockets is difficult, which can result in a lack of tightness when the joint is assembled.

There is a need for an alternative butt joint for connecting two elongate members together end to end which overcomes, or at least mitigates, some or all of the drawbacks of the known jointing arrangements.

There is a need for an alternative joint for connecting two elongate members together end to end which is easier to assemble whilst ensuring a secure connection between the elongate members.

There is a further need for an alternative joint for connecting two elongate members together end to end which is easier to manufacture than known joints.

There is a need in particular for an alternative joint for splicing together two reinforced concrete pile sections which overcomes, or at least mitigates, some or all of the drawbacks of the known jointing arrangements.

SUMMARY OF THE INVENTION

According to a first aspect of the invention, there is provided a joint for connecting first and second elongate members together end to end, the joint comprising:

a. a first connecting structure at an end of the first elongate member and a second connecting structure at an opposed end of the second elongate member;
b. one of the first and second connecting structures comprising at least one male connector unit having a longitudinally projecting male part which is tapered in the longitudinal direction;
c. the other of the first and second connecting structures having at least one female connector unit defining a correspondingly tapered recess into which the male part is received;
d. the other of the first and second connecting structures defining lateral locking pin holes aligned either side of the recess and the male part having a corresponding lateral locking pin hole which aligns with the locking pin holes in the other of the first and second connecting structures when the male part is fully inserted in the recess;
e. a locking pin insertable through the locking pin holes defined by the other of the first and second connecting structures so as to pass through the locking pin hole in the male part to lock the male part in the recess of the female connector unit;
wherein, the arrangement is configured such that when the locking pin is inserted, the male part is a tight fit in the recess.

In the joint according to the first aspect of the invention, insertion of the locking pin causes the tapered male part to be drawn further into the tapered recess so that the male part engages with the female connector unit more tightly. This provides a taper lock between the male part and the corresponding female connector unit which eliminates free play and ensures a tight joint.

In an embodiment, the at least one male part has a proximal end proximal its respective elongate member and a distal end, the at least one male part being wedge-shaped, having opposite lateral edges that are inclined towards each other in a direction from its proximal end to its distal end. The male part may be wedge-shaped, In an embodiment, the recess in the female connector unit is correspondingly shaped, having opposite lateral edges that are inclined towards each other in a direction from an outer end of the recess proximal the end of its respective elongate member to an inner end. The recess may also be wedge-shaped.

In an embodiment, said one of the first and second connecting structures comprises a pair of said male connector units and the other of said first and second connecting structures comprises a corresponding pair of said female connector units.

The joint may be a four-point joint having four male connection units and four female connector units. In an embodiment, each of the first and second connecting structures has a pair said male connector units and a pair of female connector units, each of the male parts of one of the connecting structures being received in the recess of a respective one of the female connector units of the other of the connecting structures. The joint may have a locking pin for each male connecting unit and female connecting unit combination In an embodiment at least said other of the connecting structures comprises a peripheral band encircling an end region of the respective elongate member proximal said opposed end. In which case, said female connector unit may be connected to the peripheral band by a pair of tube members which extend laterally on opposite sides of the recess and are connected to the peripheral band, the tube members defining the aligned locking pin holes.

In an embodiment in which one of the connecting structures comprises a pair of female connector units and a peripheral band encircling an end region of its respective elongate member, the female connector units may be connected to the peripheral band by means of a first tube member extending transversely between the peripheral band and a first of the female connector units in the pair, a second tube member extending transversely between the peripheral band and a second of the female connector units in the pair, and a third tube member extending transversely between the first and second female connector units in the pair, the first, second and third tube members all being aligned coaxially.

Each tube member which is connected with the peripheral band may extend through the band or be aligned with an aperture in the band such that an inner bore of the tube member is accessible from the exterior of the peripheral band.

In an embodiment, the, or each, male connector unit comprises a transverse end plate extending orthogonally to a longitudinal axis of the elongate member, the male part projecting from an outer face of the transverse end plate, the plate being dimensioned so that it cannot enter the recess defined in the corresponding female connector unit.

In an embodiment, the, or each, male part comprises a first U-shaped member, the transverse locking pin hole being defined between opposed leg portions of the first U-shaped member.

In an embodiment, the, or each, female connector unit comprises a second U-shaped member.

In an embodiment, the locking pin is a close sliding fit in the locking pin holes, an end of the pin which is to be inserted first being tapered. Where a joint has more than one male connector unit and one corresponding female connector unit, the joint may comprise a separate locking pin to lock each male part in its respective female connector unit.

In an embodiment, the, or each, male part and its respective female connector unit are configured such that, in use prior to insertion of the locking pin, the male part engages with the female part to hold the male part at a position in which the locking pin hole in the male part is not fully aligned with the locking pin holes in the female connector unit, the arrangement being such that insertion of the locking pin is operative to draw the male part further into the recess increasing the tightness of the fit between the male part and the female connector member.

In an embodiment, the elongate members are reinforced concrete pile sections. In which case, at least one of the male and female connector units may be attached to a respective reinforcing bar which extends longitudinally into their respective pile section. In an embodiment, each of the male and female connector units is attached to a respective reinforcing bar which extends longitudinally into their respective pile section. The first and second connection structures may be cast into their respective pile sections.

According to a second aspect of the invention, there is provided a taper lock arrangement for connecting opposed ends of two reinforced concrete pile sections, the taper lock comprising a male part at an end of one of the pile sections and a corresponding female part at an opposed end of the other of the pile sections, the female part defining a recess for receiving the male part, the male part and the recess both being tapered in the longitudinal direction such that the further the male part is inserted into the recess the tighter the engagement between the male part and the female part, the male and female parts having corresponding lateral locking pin holes which align when the male part is fully inserted in the recess and through which a locking pin is insertable to lock the male part to the female part, the arrangement being configured such that the opposing tapering surfaces of the male part and the female part engage before the male part is fully inserted in the recess at a position in which the locking hole in the male part is not fully aligned with the locking holes in the female part and such that subsequent insertion of a locking pin through the locking pin holes in the male and female parts is operative to draw the male part further into the recess, increasing the tightness of engagement between the male and female parts.

The locking pin may have a tapered end to aid in insertion.

The joint may comprise more than one male part and a corresponding umber of female parts. The joint may comprise four male parts and four female parts. In which case, two male parts and two female parts may be provided at the end of each of the pile sections.

According to a third aspect of the invention, there is provided a method of assembling a joint according to either of the first and second aspects of the invention, wherein the first and second elongate members are mounted end to end with the, or each, male part entering the recess of a corresponding female connector unit/part, for each male part, a locking pin is subsequently inserted through the locking holes to lock the male part to the female connector member/part, wherein insertion of the locking pin is operative to draw the male part further into the recess increasing the tightness of the fit.

According to a fourth aspect of the invention, there is provided a joint for connecting first and second elongate members together end to end, the joint comprising:
  a. a first connecting structure at an end of the first elongate member and a second connecting structure at an opposed end of the second elongate member;
  b. one of the first and second connecting structures comprising at least one male connector unit having a longitudinally projecting male part;
  c. the other of the first and second connecting structures having at least one corresponding female connector unit defining a recess into which the male part is received;
  wherein the, or each, male part comprises a U-shaped member and/or the, or each, female connector unit comprises a U-shaped member.

In an embodiment, the, or each, male part comprises a U-shaped member. In an embodiment, the interior of the U-shape component defines a transverse locking pin hole for receiving a locking pin. The U-shaped member may have opposed leg portions and a curved bridging portion connecting the leg portions at one end. The locking pin hole may be defined between the opposed leg portions and the curved bridging portion. The, or each, male connector unit may comprise a transverse end plate to which the leg portions of the U-shape member are attached.

In an embodiment, the, or each, female connector unit comprises a U-shaped member. The U-shaped member may have opposed leg portions and a curved bridging portion connecting the leg portions at one end. The recess may be defined by a cut out extending through the curved bridging portion and part way along each of the leg portions. The cut out may be located in a generally central region of the U-shaped member. Transverse locking pin holes may be defined between the leg portions and the curved bridging portion either side of the recess. The transvers locking pin holes may be defined by tube members attached to the second U-shaped member between the leg portions and within the curved bridging portion. The connecting structure may comprises a peripheral band encircling an end region of the respective elongate member proximal said opposed end. In which case, at least one of the tube members may be attached to the peripheral band. The at least one of the tube members may extend through or be aligned with an aperture in the peripheral band such that an interior bore of the tube member is accessible externally of the peripheral band.

DETAILED DESCRIPTION OF THE INVENTION

In order that the invention may be more clearly understood one or more embodiments thereof will now be described, by way of example only, with reference to the accompanying drawings, of which.

The invention will now be described with reference to a joint for connecting or splicing two reinforced concrete pile sections together end to end, for which it is particularly advantageous. However, the principles of the joint can be adapted for use in connecting other types of elongate members together, as will be apparent.

References herein, including in the claims, to "longitudinal" and "longitudinally" or the like should be understood a referring to a direction corresponding to the longitudinal extent of the pile sections or other elongate members to which the joint is applied in use. Similarly, references herein, including in the claims, to "lateral", "laterally", "transverse", and "transversally" or the like should be understood as referring to a direction orthogonal to the longitudinal extent of the pile sections or other elongate members to which the joint is applied in use.

A joint (indicated generally at 10) for connecting two reinforced concrete pile sections 12, 14 together end to end includes a first connecting structure 16 mounted to an end region of a first of the pile sections 12, a second connecting structure 18 mounted to an opposing end region of a second of the pile sections, and at least one locking pin 20 for locking the connecting structures together.

Figure 1:
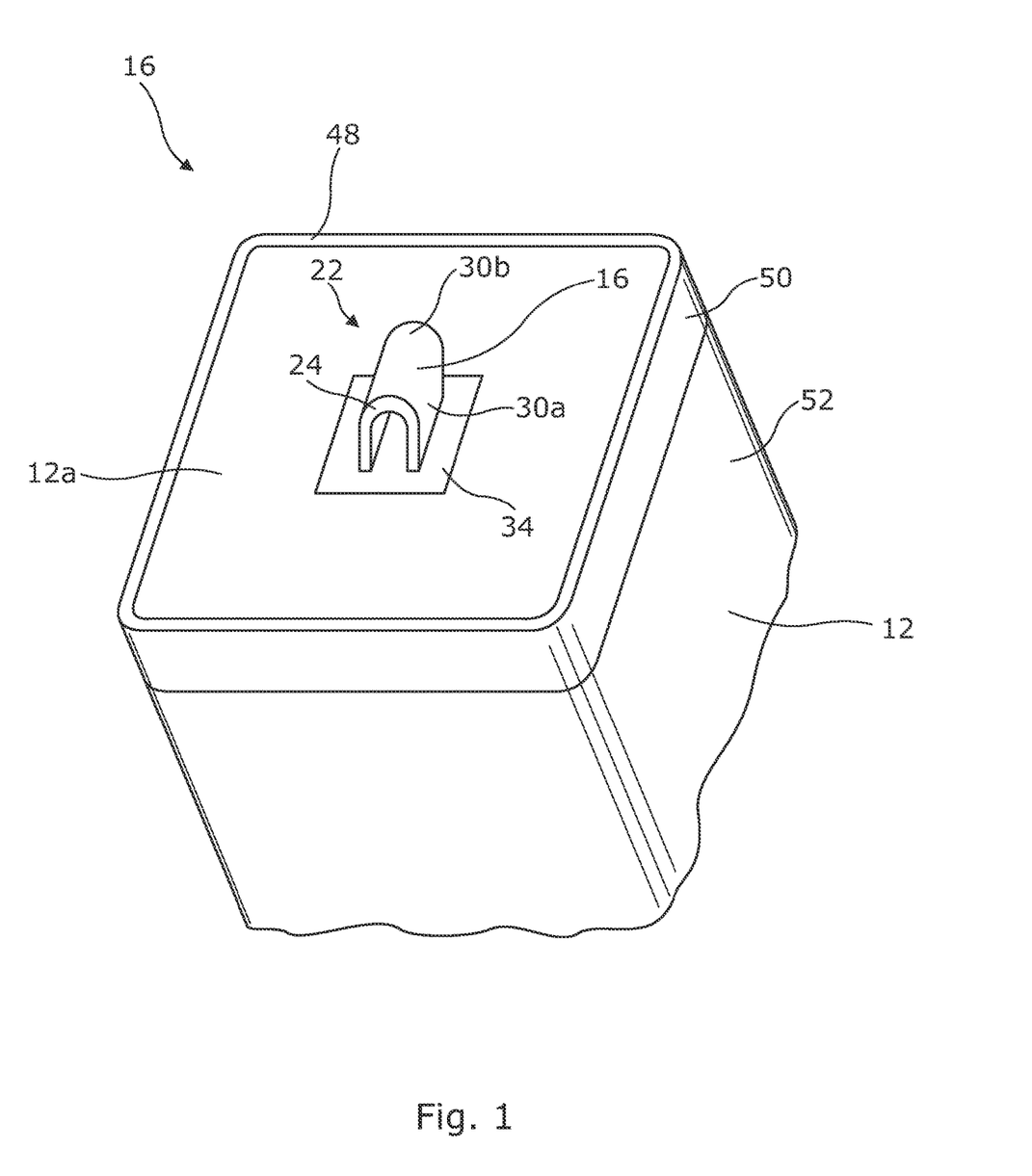
FIG. 1 is a perspective view of an end region of a first reinforced concrete pile section having a first connecting structure forming part of a joint for connecting the first pile section to a second pile section according to an aspect of the invention.
Figure 2:
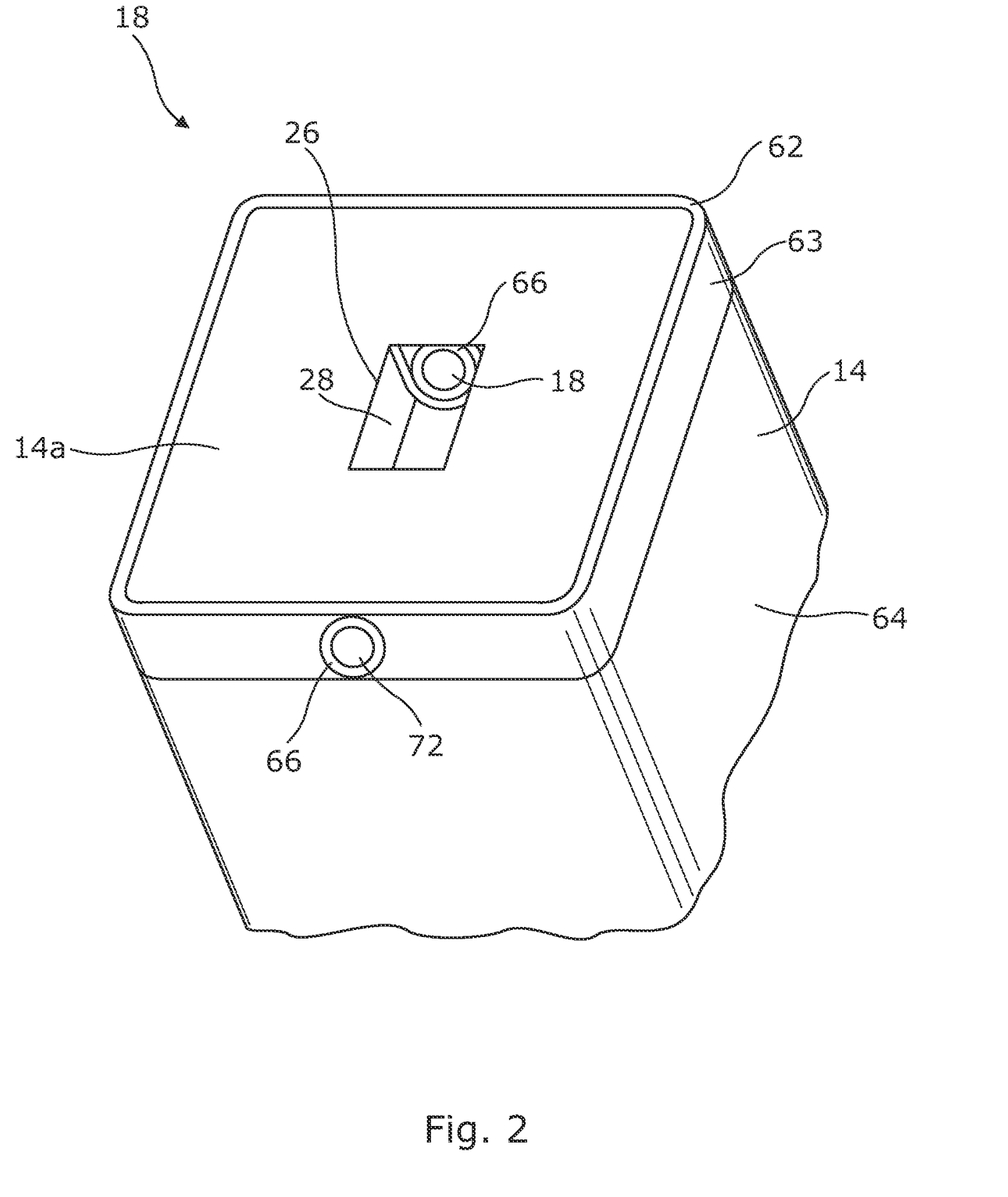
FIG. 2 is a perspective view of an end region of a second reinforced concreate pile section having a second connecting structure forming another part of the joint for connecting the first pile section to the second pile section according to an aspect of the invention.

In a first embodiment, the joint 10 is a single-point joint and the first connecting structure 16 has a single, centrally located male connector unit 22 having a male part 24 projecting longitudinally beyond the end face 12a of the first pile section 12. The second connecting structure 18 has a single corresponding female connector unit 26 located at the centre of the opposed end face 14a of the second of the pile sections 14. The female connector unit is inset into the end face 14a of the second pile section 14 and defines a recess 28 which is open at the end face 14a and into which the male part 24 is inserted when the two pile sections are connected end to end, with their end faces 12a, 14a in abutment.

The male connector unit 22 has a transverse end plate 32 embedded in the end face 12a of the first pile section so that its outer face 34 is flush/coplanar with the end face 12a. The male part 24 comprises a first U-Shaped member 30 which is mounted to and projects longitudinally from the outer face of the transverse end plate 32. The first U-shaped member has a pair of opposed leg portions 30a interconnected by a curved, bridging portion 30b. The leg portions 30a are attached to the transverse end plate 32 at a proximal end 36 of the male part adjacent the end face 12a whilst the curved, bridge portion 30b defines a closed distal end 38 of the male part. As seen best in FIGS. 4 and 6, longitudinally extending outer lateral edges 40, 42 of the male part 24 are inclined towards each other in a direction from the proximal end 36 to the distal end 38 so that the male part tapers in the longitudinal direction, being narrower at its distal end than at its proximal end. The male part 24 can be described as wedge-shaped. A reinforcing bar 44 is attached to an inner face 46 of the transverse end plate 32 and extends longitudinally into the first pile section. The reinforcing bar can also be considered part of the male connector unit 22. The first connecting structure 16 also includes a first peripheral strengthening band 48 which encircles the periphery of the end region of the first pile section 16 adjacent its end face 12a. The first peripheral band 48 is recessed into the side of the first pile section 12 so that its outer surface 50 is flush with the outer surface 52 of pile section outside of the end region.

The male part 24, the transverse end plate 32, the reinforcing bar 44, and the first peripheral band 48 can be made of any suitable materials. Advantageously, they are manufactured from metal, such as steel and especially stainless steel. The male part 24, the transverse end plate 32 and the reinforcing bar 44 may be welded together.

The male connector unit 22 and the first peripheral band 48 are cast into the first pile section 12 but are otherwise unconnected. A suitable jig can be used to hold the male connector unit 22 and the first peripheral band 48 in their correct positions whilst the first pile section 12 is cast.

Figure 3:
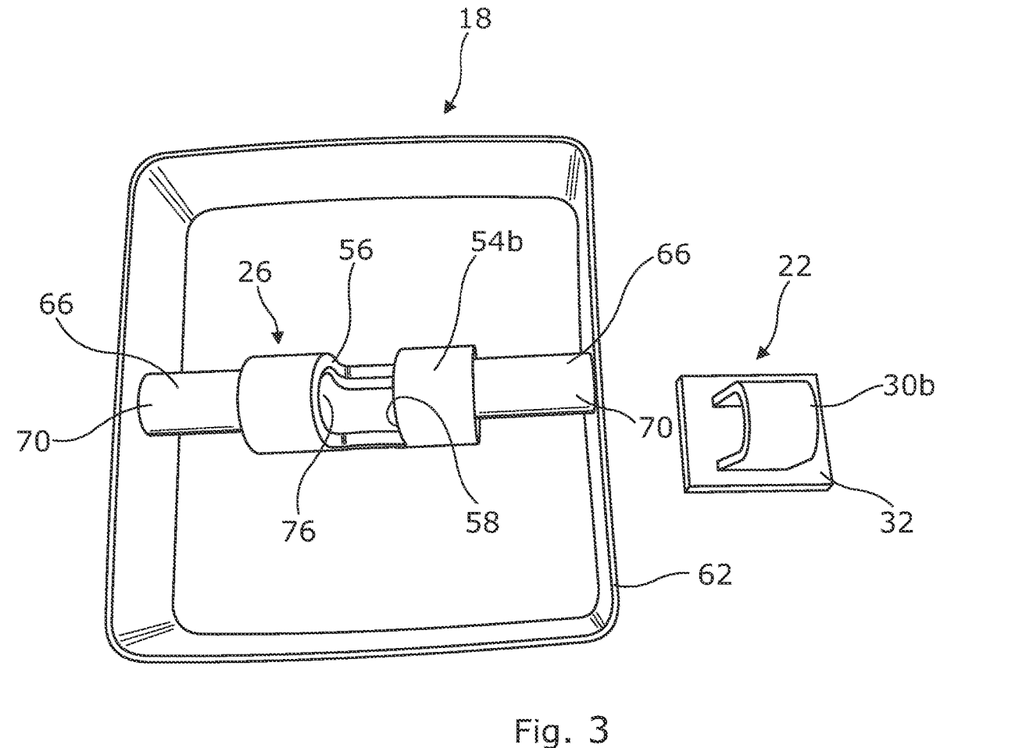
FIG. 3 is a perspective view taken almost in plan of the second connecting structure of FIG. 2 next to a male part of the first connecting structure of FIG. 1 with the concrete pile sections omitted.

The female connector unit 26 of the second connecting structure comprises a second U-shaped member 54 having a pair of spaced opposed leg portions 54a and a curved bridging portion 54b interconnecting the leg portions at one end. The outermost surface of the closed bridging portion is located proximal to or flush with the end face 14a of the second pile section 24 whilst the leg portions extended longitudinally into the second pile section. The recess 28 is defined by means of a cut-out formed through the bridging portion 54b and extending part way along each of the leg portions 54a at the centre of the second U-shaped member 54. When the female connector unit 26 is in position in the second pile section 14, the recess 28 opens at its end face 14a. The lateral side edges 56, 58 of the recess are inclined towards each other in a direction from outer end of the recess to the inner end so that the recess is tapered in a manner that corresponds to the tapering of the lateral side surfaces 40, 42 of the male part 24. The female convector unit 26 also includes a reinforcing bar 60 attached to the inner ends of the leg portions 54a of the second U-shaped member and which extends longitudinally along the section pile section 14.

The second connecting structure 18 includes a second peripheral strengthening band 62 which extends about the periphery of an end region of the second pile section 14 proximal the end face 14a. The second peripheral band 62 is embedded within the periphery of the second pile section so that its outer surface 63 is substantially flush with the outer surface 64 of the second pile section 14 outside of the end region.

Figure 4:
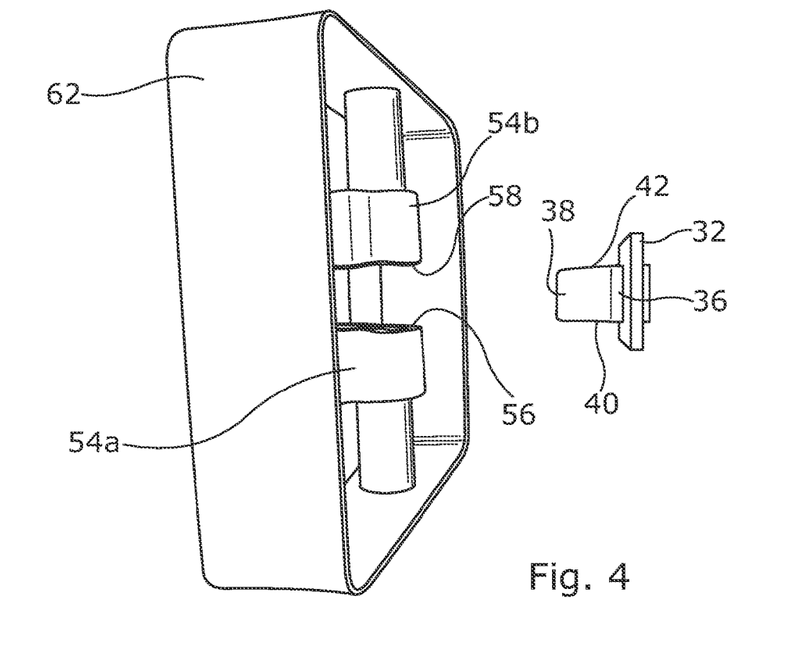
FIG. 4 is a perspective view similar to that of FIG. 3 but taken from a different angle.
Figure 5:
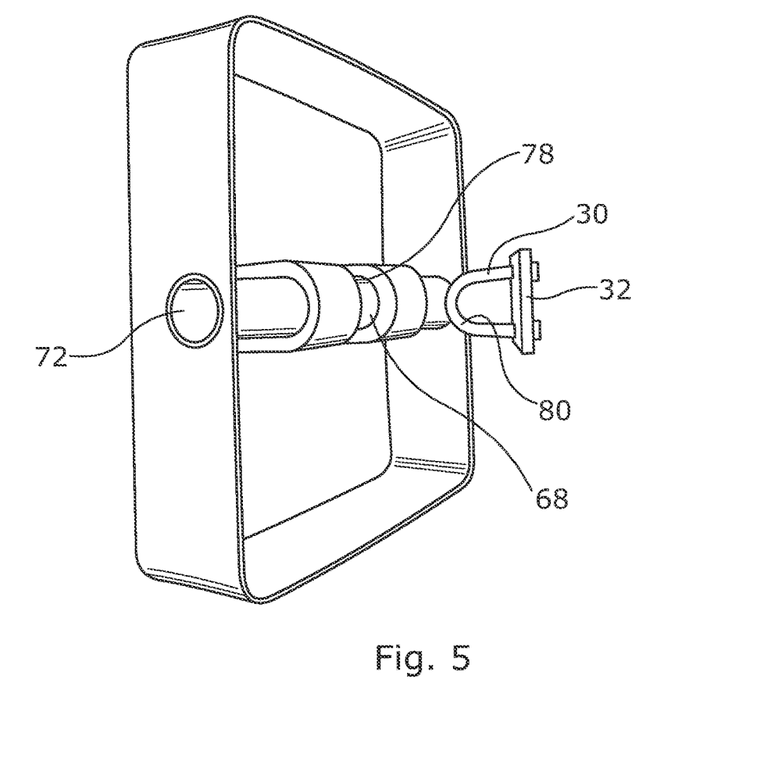
FIG. 5 is a further perspective view similar to that of FIG. 3 but taken from another different angle.

The female connector unit 26 is attached to the second peripheral band by a pair of tube members 66 which extend laterally either side of the recess 28. Inner ends 68 of the tube members are located with the U-shaped member 54 close to the closed, bridging section 54b and do not extend within the recess 28. The outer ends 70 of the tube members are located within apertures in the peripheral band such that inner bores 72 of the tube members are accessible externally of the second peripheral band.

Figure 6:
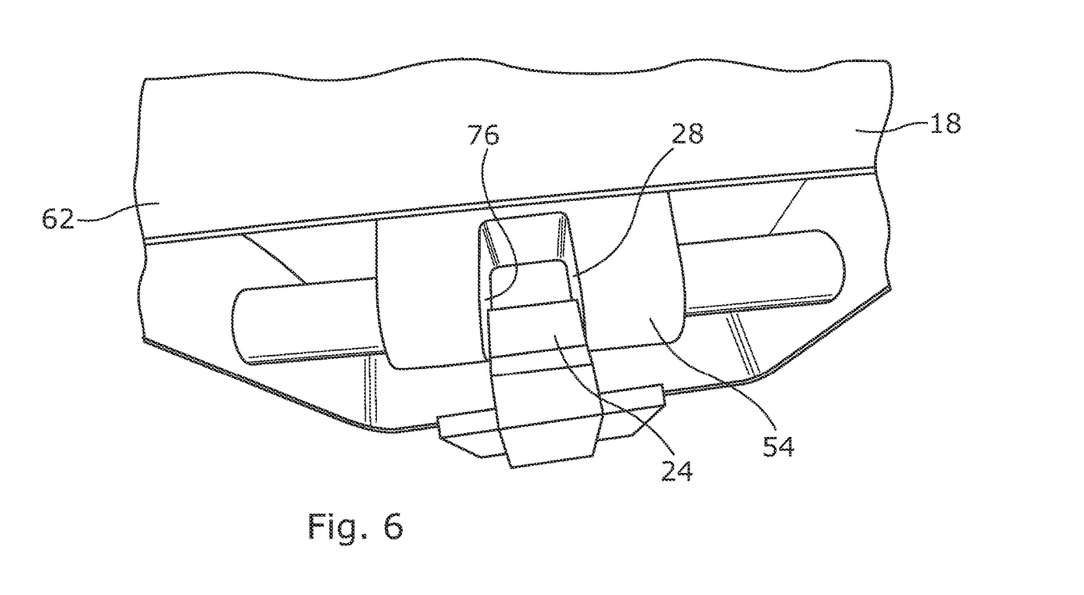
FIG. 6 is a view similar to that of FIG. 5 but slightly enlarged and illustrating how the male part is inserted into a recess defined in a female connector unit of the second connecting structure.

The tube members 66 are aligned co-axially so that the locking pin 20 can be inserted from outside the second peripheral band 62 through one or the tube members to pass across the recess 28 and enter the other tube member. Inner ends of the tube members attached to the second U-shaped member can be considered to be part of the female connector unit and their inner bores 72 in this region define transverse locking pin holes 76, 78 either side of the recess 28. The interior the U-shaped male part 24 close to the closed bridging portion 30b at its distal end defines a corresponding transverse locking pin hole 80 which aligns with locking pin holes 76, 78 in the female connector unit 26 when the male part is fully inserted in the recess 28.

The second U-shaped member 54, the reinforcing bar 60, the second peripheral band 62 and the tube members 66 can made from any suitable materials. Advantageously they are manufactured from metal, such as steel and especially stainless steel and are welded together.

The components of the second connecting structure 18 are cast in position at the end of the second pile section 14. A suitable jig can be used to hold the components in their correct positions whilst the second pile section 14 is cast.

Figure 7:
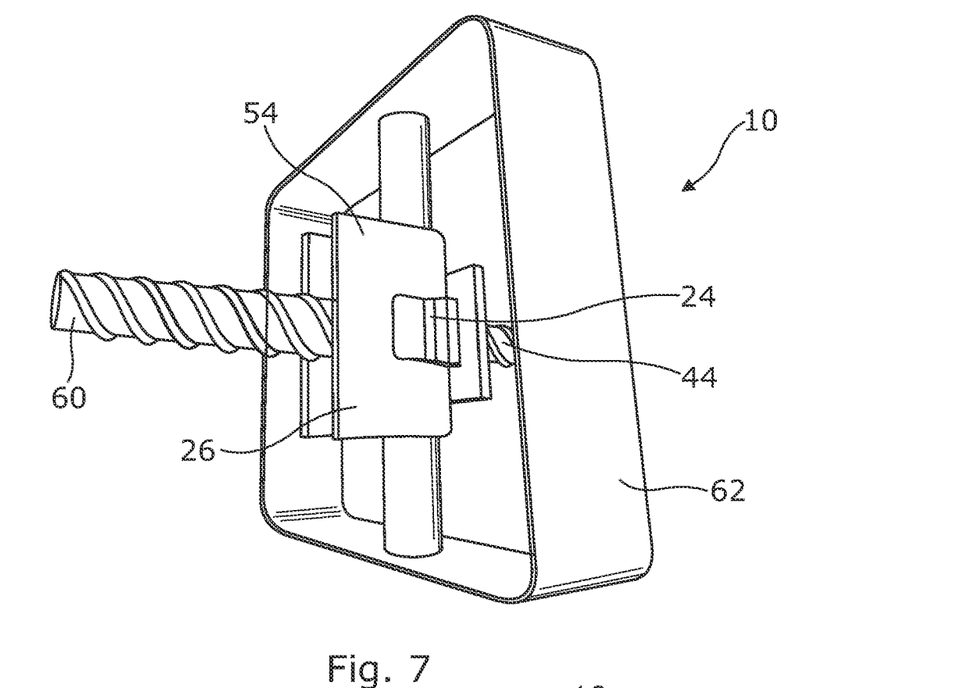
FIG. 7 is a perspective view showing how the first and second connecting structures are assembled together to form a joint, the end regions of the concrete pile sections being omitted for clarity.

The locking pin 20 is a generally cylindrical pin which is a close sliding fit in the inner bores 72 of the tube members 66 and locking pin hole 80 defined by the interior of the curved bridging portion 30b of the U-shaped male part 24. An end of the locking pin which is inserted first is tapered to assist in locating the pin in the male part as the pin 20 is inserted.

Assembly of the joint to connect the first and second pile sections 12, 14 will now be described.

In order to assemble the joint and connect the first and second pile sections 12, 14 together, one of the first pile sections 12, 14 will usually be mounted vertically with one end in the ground and the other pile section 12, 14 is positioned on top of the ground mounted pile section end to end. For the purposes of the following description, it will be assumed that the second pile section 14 is mounted in the ground and that the first pile section 12 is to be joined to it. However, it should be appreciated that the positions of the pile sections could be reversed.

Figure 8:
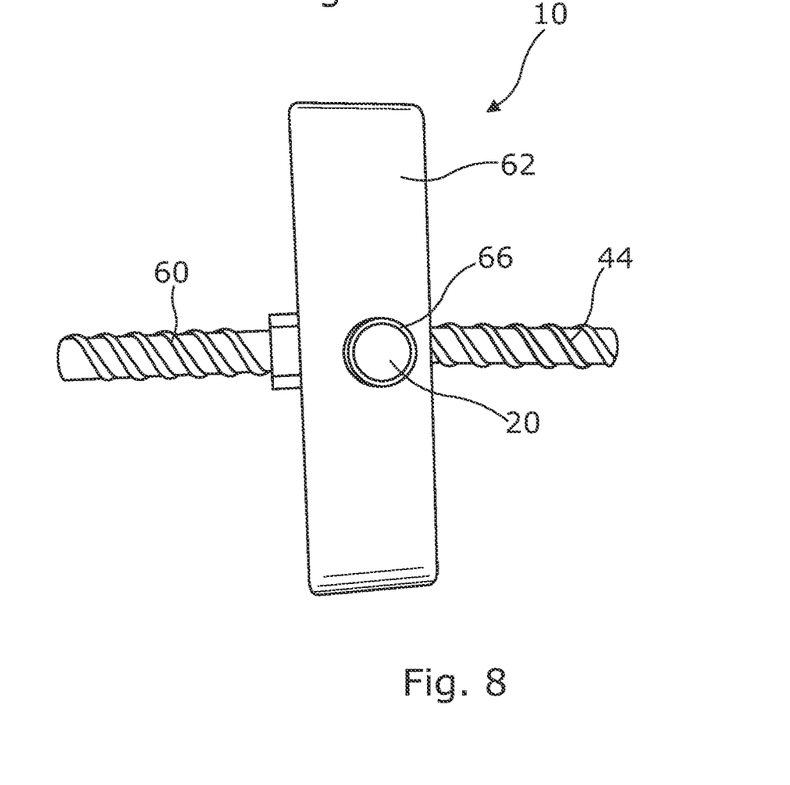
FIG. 8 is a view from one side of the assembly of FIG. 7.

With the second pile section 14 mounted vertically in the ground and the end having the second connection structure 18 uppermost, the first pile section 12 is positioned above the second pile section with the end 12a having the first connecting structure 16 opposing the end 14a of the second pile section 14. The first pile section 12 is lowered so that the male part 24 enters the recess 28 in the female connecting unit, with the tapered lateral surfaces 40, 42 of the male part 24 opposing the tapered lateral surfaces 56, 58 of the recess. The first pile section 12 is lowered until its end face 12a abuts the end face 14a of the second pile section. The male part 24 and the recess 28 in the female connector unit are dimensioned so that as the male part 24 enters further into the recess 28, the tapered lateral surfaces 40, 42 of the male part 24 engage with the tapered lateral surfaces 56, 58 of the recess to form a tight fit. Prior to insertion of the locking pin, the male part 24 engages the sides 56, 58 of the recess such that the male part is not fully inserted and the locking hole 80 defined in the male part is not fully aligned with the locking holes 76, 78 either side of the recess. In this regard, the bridging part 30b of the male member is slightly raised relative to the locking holes 76,78. To lock the joint, the locking pin 20 is inserted through one of the tube members 66 with its tapered end innermost until the tapered inner end enters the locking hole 80 in the male part. The locking pin 20 is then hammered home so that the pin fully enters the locking hole 80 in the male part and eventually enters the locking hole defined by the other tube member on the other side of the recess. As the locking pin enters and passes through the male part, the taper of the locking pin causes the male part to be drawn further into the recess increasing the tightness of fit between the tapered male part 24 and the female connector unit. This removes any free-play and results in a taper lock.

The joint 10 as described above is a single-point lock having a single male part 24 and a single female connector unit and recess 28. This type of joint is particularly suitable where the connected pile sections will be in tension. However, for other applications a multi-point joint having more than one male part 24 and a corresponding number of recesses 28 may be required.

Figure 9:
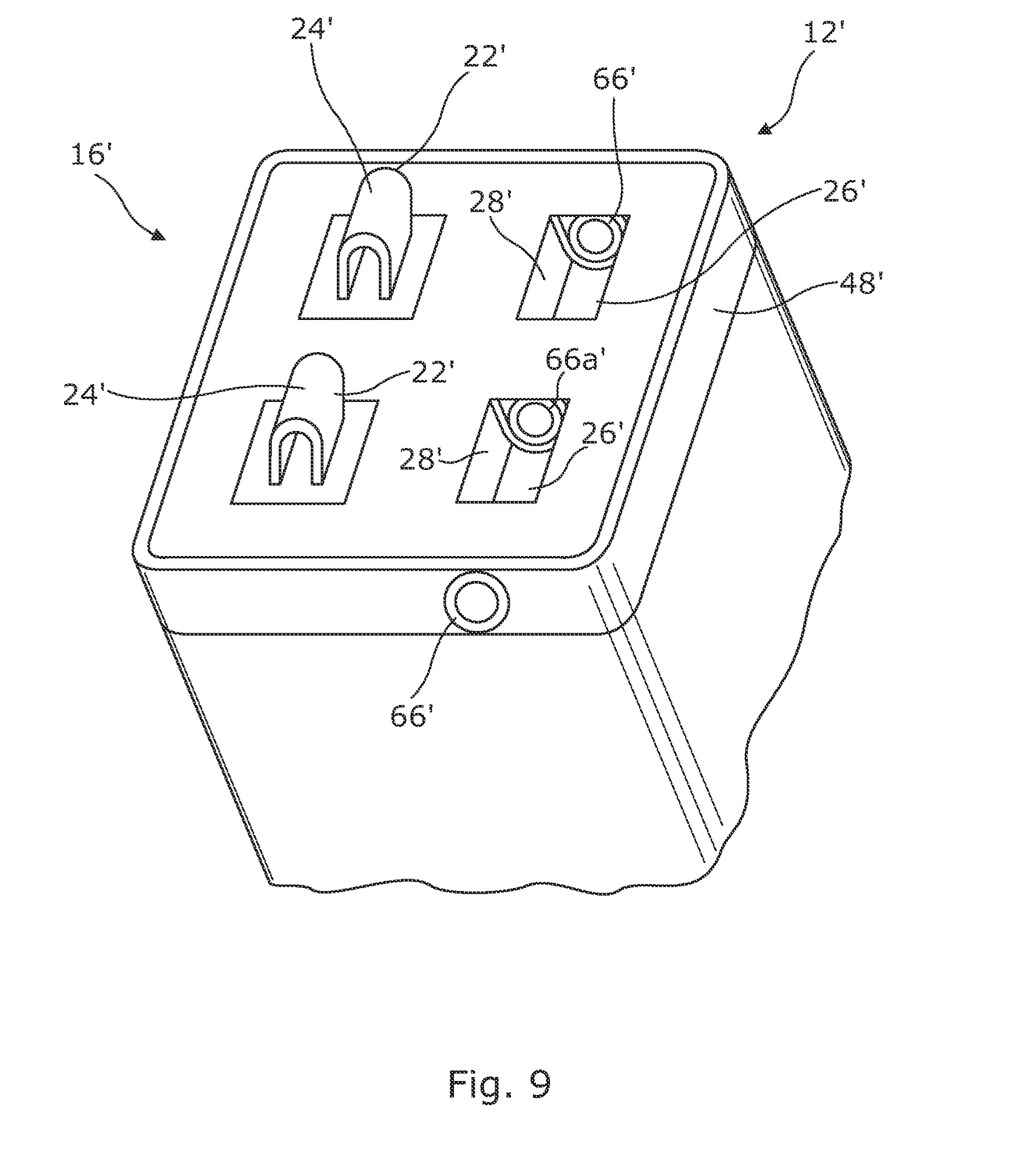
FIG. 9 is a view similar to that of FIG. 1 but showing an alternative embodiment of the first connecting structure which can be used to form a four-point joint between two reinforced concrete pile sections.

FIG. 9 illustrates the end of a first pile section 12' having a first connecting structure 16' adapted to form a four-point joint. The first connecting structure in this embodiment has two male connector units 22' aligned side by side but spaced apart to side of the end face 12a. Each of the male connector units 22' is substantially the same as the male connector unit 22 as described above in relation to the first embodiment, each having a tapered male part 24'. The first connecting structure 16' also has a pair of female connector units 26' aligned side by side but spaced apart on the other side of the end face 12a. Each of the female connector units 26' is broadly similar to the female connector unit 26 as described above in relation the first embodiment, each defining a tapered recess 28' for receiving a corresponding male part. Each of the female connector units 26' is attached to the first peripheral band 48' by a respective tube member 66' on one side and the two female connector units are connected together by a further tube member 66a'. All the tube members being in coaxial alignment.

The first pile section 12' is joined to a second pile section having a second connecting structure which is the same as the first connecting structure 16' (or a mirror image) such that each of the male parts 24' of one of the connecting structures is received in the recess of a respective one of the female connector units 26' of the other of the connecting structures when the two pile sections are mounted one to the other. A separate locking pin 20 is then used to lock each of the male parts 24' to their respective female connector units 26' to form a taper lock.

The one or more embodiments are described above by way of example only. Many variations are possible without departing from the scope of protection afforded by the appended claims. For example, the male and female parts can be constructed in various different ways provided that the male part and the recess are correspondingly tapered and that the male part is drawn fully into the recess to form a taper lock when the locking pin is inserted. Further, it is not essential that the, or each female connector unit, be connected to the peripheral bands by a tube member. Rather, lateral locking pin holes could be cast into the end of a pile section to enable a locking pin to be inserted when the pile sections are joined. Whilst the taper lock is particularly advantageous, a joint constructed as described above but in which the male part and recess in the female connector unit are not tapered still provides numerous advantages. In particular, constructing the male part and the female connector unit from U-shaped members provides a method of construction which is simplified in comparison to previous known joints.

The invention claimed is:

1. A joint for connecting first and second elongate members together end to end, the joint comprising:
   a. a first connecting structure at an end of the first elongate member and a second connecting structure at an opposed end of the second elongate member;
   b. one of the first and second connecting structures comprising at least one male connector unit having a longitudinally projecting male part which is tapered in the longitudinal direction, wherein the at least one male part has a proximal end proximal its respective elongate member and a distal end, wherein the at least one male part comprises a U-shaped member, the U-shaped member having opposed leg portions and a curved bridging portion connecting the leg portions at the distal end, and wherein the leg portions each comprise a pair of opposing longitudinally extending outer lateral edges that are inclined towards each other in a direction from the proximal end to the distal end, such that the male part tapers in the longitudinal direction, being narrower at its distal end than at its proximal end;
   c. the other of the first and second connecting structures having at least one female connector unit defining a correspondingly tapered recess into which the male part is received;
   d. the other of the first and second connecting structures defining lateral locking pin holes aligned either side of the recess and the male part having a corresponding lateral locking pin hole which aligns with the locking pin holes in the other of the first and second connecting structures when the male part is fully inserted in the recess;
   e. a locking pin insertable through the locking pin holes defined by the other of the first and second connecting structures so as to pass through the locking pin hole in the male part to lock the male part in the recess of the female connector unit;
   wherein, the arrangement is configured such that when the locking pin is inserted the male part is a tight fit in the recess.

2. A joint as claimed in claim 1, wherein the at least one male part being wedge-shaped, having opposite lateral edges that are inclined towards each other in a direction from its proximal end to its distal end.

3. A joint as claimed in claim 2, wherein the recess in the female connector unit is correspondingly shaped, having opposite lateral edges that are inclined towards each other in a direction from an outer end of the recess proximal the end of its respective elongate member to an inner end.

4. A joint as claimed in claim 1, wherein said one of the first and second connecting structures comprises a pair of said male connector units and the other of said first and second connecting structures comprises a pair of said female connector units.

5. A joint member as claimed in claim 4, wherein each of the connection members has a peripheral band encircling an end region of its respective elongate member, and each pair of female connector units being connected to the peripheral band forming part of their respective connecting structure by means of a first tube member extending transversely between the peripheral band and a first of the female connector units in the pair, a second tube member extending transversely between the peripheral band and a second of the female connector units in the pair, and a third tube member extending transversely between the first and second female connector units in the pair, the first, second and third tube members all being aligned coaxially.

6. A joint as claimed in claim 1, wherein each of the first and second connecting structures has a pair of said male connector units and a pair of said female connector units, each of the male parts of one of the connecting structures being received in the recess of a respective one of the female connector units of the other of the connecting structures.

7. A joint as claimed in claim 1, wherein at least said other of the connecting structures comprises a peripheral band encircling an end region of the respective elongate member proximal said opposed end.

8. A joint as claimed in claim 7, wherein said female connector unit is connected to the peripheral band by a pair of tube members which extend laterally on opposite sides of the recess and are connected to the peripheral band, the tube members defining the aligned locking pin holes.

9. A joint as claimed in claim 8, wherein each tube member which is connected with the peripheral band extends through the band or is aligned with an aperture in the band such that an inner bore of the tube member is accessible from the exterior of the peripheral band.

10. A joint as claimed in claim 1, wherein the, or each, male connector unit comprises a transverse end plate extending orthogonally to a longitudinal axis of the elongate member, the male part projecting from an outer face of the transverse end plate, the plate being dimensioned so that it cannot enter the recess defined in the corresponding female connector unit.

11. A joint as claimed in claim 1, wherein the transverse locking pin hole being defined between opposed leg portions of the first U-shaped member.

12. A joint as claimed in claim 1, wherein the female connector unit comprises a first U-shaped member.

13. A joint as claimed in claim 1, wherein the locking pin is a close sliding fit in the locking pin holes, an end of the pin which is to be inserted first being tapered.

14. A joint as claimed claim 1, the, or each, male part and its respective female connector unit are configured such that, in use prior to insertion of the locking pin, the male part engages with the female part to hold the male part at a position in which the locking pin hole in the male part is not fully aligned with the locking pin holes in the female connector unit, the arrangement being such that insertion of the locking pin is operative to draw the male part further into the recess increasing the tightness of the fit between the male part and the female connector member.

15. A joint as claimed in claim 1, wherein the elongate members are reinforced concrete pile sections.

16. A joint as claimed in claim 15, wherein at least one of the male and female connector units is attached to a respective reinforcing bar which extends longitudinally into their respective pile section.

17. A joint as claimed in claim 15, wherein each of the male and female connector units is attached to a respective reinforcing bar which extends longitudinally into their respective pile section.

18. A joint as claimed in claim 15, wherein the first and second connection structures are cast into their respective pile sections.

19. A method of assembling a joint as claimed claim 1, wherein the first and second elongate members are mounted end to end with the, or each, male part entering the recess of a corresponding female connector unit, for each male part, a locking pin is subsequently inserted through the locking holes to lock the male part to the female connector member, wherein insertion of the locking pin is operative to draw the male part further into the recess increasing the tightness of the fit.

\* \* \* \* \*

UNITED STATES PATENT AND TRADEMARK OFFICE
CERTIFICATE OF CORRECTION

PATENT NO. : 12,152,364 B2
APPLICATION NO. : 18/002641
DATED : November 26, 2024
INVENTOR(S) : Charles Carver Page 1 of 1

It is certified that error appears in the above-identified patent and that said Letters Patent is hereby corrected as shown below:

In the Claims

In Column 9, Line 34, in Claim 1, delete "has a proximal" and insert --has an--.

In Column 10, Line 60, in Claim 14, after "claimed" insert --in--.

In Column 11, Line 16, in Claim 19, after "claimed" insert --in--.

Signed and Sealed this
Fourth Day of March, 2025

Coke Morgan Stewart
*Acting Director of the United States Patent and Trademark Office*